United States Patent
Adler et al.

(10) Patent No.: US 6,501,837 B1
(45) Date of Patent: Dec. 31, 2002

(54) TELEPHONE CALL CONNECTION ARCHITECTURE

(75) Inventors: Barry Michael Adler, Dallas, TX (US); Steve Jasper, Mississauga (CA); Richard Perez, Haltom City, TX (US); Michael Sherwood, Plano, TX (US)

(73) Assignee: WorldQuest Network, Inc., Dallas, TX (US)

(*) Notice: Subject to any disclaimer, the term of this patent is extended or adjusted under 35 U.S.C. 154(b) by 0 days.

(21) Appl. No.: 09/350,851

(22) Filed: Jul. 9, 1999

(51) Int. Cl.[7] .................................................. H04M 7/00
(52) U.S. Cl. ........................ 379/210.01; 379/221.01; 370/352
(58) Field of Search .................... 379/201.01, 210.01, 379/219, 220.01, 221.01, 223; 370/352, 353, 354

(56) References Cited

U.S. PATENT DOCUMENTS

| | | |
|---|---|---|
| 4,166,929 A | 9/1979 | Sheinbein |
| 4,933,966 A | 6/1990 | Hird et al. |
| 5,012,510 A | 4/1991 | Schaubs et al. |
| 5,093,858 A | 3/1992 | Hird et al. |
| 5,113,433 A | 5/1992 | Hird et al. |
| 5,155,761 A | 10/1992 | Hammond |
| 5,157,716 A | 10/1992 | Naddor et al. |
| 5,311,583 A | 5/1994 | Friedes et al. |
| 5,406,616 A | 4/1995 | Bjorndahl |
| 5,425,091 A | 6/1995 | Josephs |
| 5,430,790 A | 7/1995 | Williams |
| 5,483,581 A | 1/1996 | Hird et al. |
| 5,517,564 A * | 5/1996 | Slater et al. ............ 379/207 X |
| 5,740,229 A | 4/1998 | Hanson et al. |
| 5,761,289 A | 6/1998 | Keshav |
| 5,784,438 A | 7/1998 | Martinez |
| 5,815,669 A * | 9/1998 | Lee et al. ............... 395/200.68 |
| 6,169,796 B1 * | 1/2001 | Bauer et al. ............ 379/212 X |
| 6,205,216 B1 * | 3/2001 | Slater et al. ............ 379/220 X |

OTHER PUBLICATIONS

MCIWORLDCOM International Web pp. Mar. 4, 1999.

* cited by examiner

Primary Examiner—Creighton Smith
(74) Attorney, Agent, or Firm—Howison, Thoma & Arnott, L.L.P.

(57) ABSTRACT

A telephone call connection architecture is disclosed which establishes a call connection between two parties. A caller at a caller location initiates a call request to an intermediate location over a first communication network requesting a call be connected to a callee at a callee location over a second communication network. The caller location is connected to the callee location over the second communication network in response to the call request being made over the first communication network. In both a call back and call collect scenario, the caller initiates the call request to the intermediate location. However, in a call back situation, the caller is ultimately charged for the call, while in a call collect situation, the callee authorizes charges for the call.

41 Claims, 5 Drawing Sheets

TELEPHONE CALL CONNECTION ARCHITECTURE

TECHNICAL FIELD OF THE INVENTION

The present invention pertains in general to a method for making a telephone call between two parties and, more particularly, to a method for making a telephone call utilizing a call-back feature from an intermediate point.

BACKGROUND OF THE INVENTION

When making a call between two parties, the typical approach is to initiate the call at a caller location through a Public Switch Telephone Network (PSTN) which then effects a connection to a callee location. Once the call is completed, then billing is done through normal channels. Of course, many different techniques can be utilized for selecting the various providers to ensure long distance calls are at the most favorable rates.

One disadvantage in completing a call between the caller location and the callee location is that involved with going through providers in locations such as foreign countries. In these situations, outgoing calls from the foreign country are billed through the foreign country's telecommunications network. These are typically onerous costs. One way to alleviate these problems is to have some type of call-back feature wherein the call is actually originated from a country having more favorable rates, and then the call connected from that country. In these situations, some businessmen actually call their office and have the office call them back at their location to reduce the cost.

One type of call-back system that has been automated is that wherein a caller initiates a call from a foreign country to a number in, for example, the United States. This number is typically toll-free number and is often referred to as a direct-inward-dial (DID) phone number. The actual ringing of this number is recognized as being an initiated call from the caller. The caller then hangs up and the called location, recognizing that this was the caller, will then access its database and ring back to the caller's location. This, of course, requires setting this up prior to leaving the country. The caller will then have a connection made between an intermediate point in the United States (US) and their location in the foreign country which call was originated from the US, thus incurring more favorable rates. The calling party then enters a personal identification number (PIN) and the number of callee party to allow a connection therebetween. However, this system is limiting in that the caller must pre-configure the system to their location and does not have latitude to move about a foreign country. This system also does allow the calling party to dial a toll-free access number and enter information as to their phone number for a call-back feature which then allows the user to be connection to an intermediate point in the US, and then input various PIN numbers and as such. However, this, again requires a telephone call to be initiated and completed from outside the country to the US and then some action to call back the calling party.

In addition to the call-back feature, there are also features provided in the form of collect calls which we term "call collect" for the purpose of this application. These involve situations wherein the party outside the country desires to place a collect call to a callee or even from within the same country. These, again, typically incur onerous costs.

SUMMARY OF THE INVENTION

The invention disclosed and claimed herein is a method and system of establishing a call between two parties. A call request is initiated by a caller at a caller location over a first communication network to an intermediate location. The call request seeks to cause a call to be connected between caller at a caller location and a callee at a callee location over a second communication network. The call is connected to the caller location over the second communication network, and then in response to connecting to the caller location, the callee location and the caller location are connected over the second communication network.

In another aspect of the invention, a method and system for establishing a call between two parties is disclosed wherein a call request is initiated by a caller at a caller location over a first communication network to an intermediate location. The call request seeks to cause a call to be connected to a callee at a callee location over a second communication network. The call is connected to the caller location over the second communication network. A confirmation is requested from the callee location in order that a connection between the caller location and the callee location be authorized. In response to receiving the confirmation from the callee location, a connection is made between the callee location and the caller location over the second communication network.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
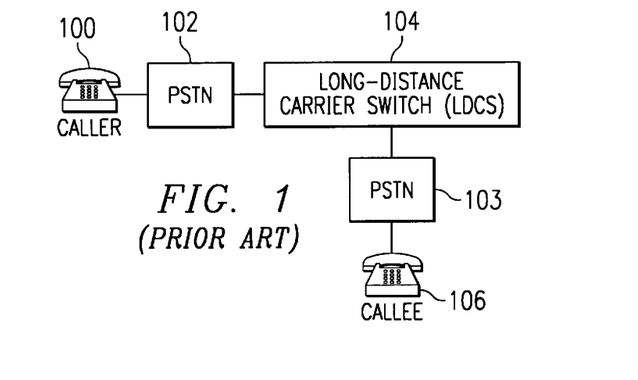
FIG. 1 illustrates a block diagram depicting a prior art system for placing a call between two locations, a caller location and a callee location.

Referring now to FIG. 1, there is illustrated a block diagram depicting a prior art system for placing a call between two locations, a caller location 100 and a callee location 106, both represented by a handset. Typically, the caller location 100 will initiate the call through a PSTN 102 utilizing a long distance carrier switch (LDCS) 104. This switch 104 will then make a connection to a PSTN 103 associated with the callee location 106. Therefore, the call is initiated by placing a call through the PSTN 102 through the switch 104 to the callee PSTN 103 to complete the call to the calling location 106. This is a typical system which basically incurs the costs associated with the long distance provider that controls the switch 104.

Figure 2:
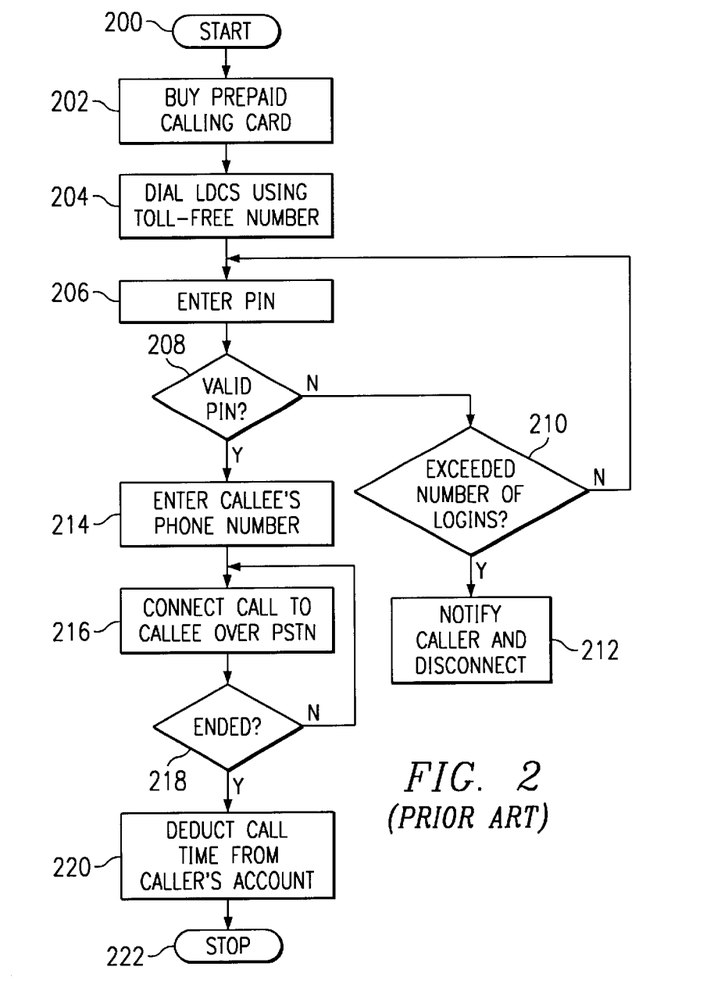
FIG. 2 illustrates a flowchart depicting a prior art system for utilizing a long distance carrier switch and a pre-paid calling card.

Referring now to FIG. 2, there is illustrated a flowchart depicting a prior art system for utilizing a long distance carrier switch 104 and a pre-paid calling card. This program is initiated at a start block 200 then proceeds to a block 202 wherein the customer buys a pre-paid calling card. The program then flows to a function block 204 wherein the customer utilizes their pre-paid calling card function which first requires the LDCS 104 to be called utilizing a toll-free number, which toll-free number is typically found on the back of the pre-paid card. Once the customer (also known as a caller) is connected, he or she will then enter a personal identification number (PIN), as represented by function block 206. Then program then flows to a decision block 208 wherein the system determines whether this is a valid PIN. If not, the program will flow along the "N" path back to a decision block 210 to determine if the number of logins has been exceeded. Typically, those systems will only allow so many tries at inputting a PIN. If the number of logins has been exceeded, the program will flow along the "Y" path to a function block 212 to notify the caller that such a situation has occurred and then a disconnect will occur. However, until they exceed the number of logins, the program will flow along the "N" path back to the input of the function block 206.

Once the valid PIN has been input, the program will flow along the "Y" path of decision block 208 to a function block 214, wherein the caller is prompted to enter the callee phone number. The program then flows to a function block 216 wherein the call is connected between the callee and the caller over the various PSTNs (102 and 103) and the card providers LDCS 104. The program will then flow from function block 216 to a decision block 218 to determine if the call has ended. If not, the program will loop back along the "N" path to the input of function block 216 to maintain the connection. When the call has ended, the program will flow along the "Y" path to a function block 220 to basically deduct call time from the caller's account and then to a stop block 222, where the program will end. Typically, the PIN will identify the caller and their calling card which has an account at the business office of the long distance provider. This is particularly utilized to maintain an account as to the time remaining on the calling card. Of course, the caller only has a limited amount of time on their card. This may be indicated to the caller when they enter their PIN number such that they have knowledge of the amount of time left on their card. When this time is close to expiring, some type of prompt will be interspersed into the call to the calling party to indicate that their call is about to be terminated.

Figure 3:
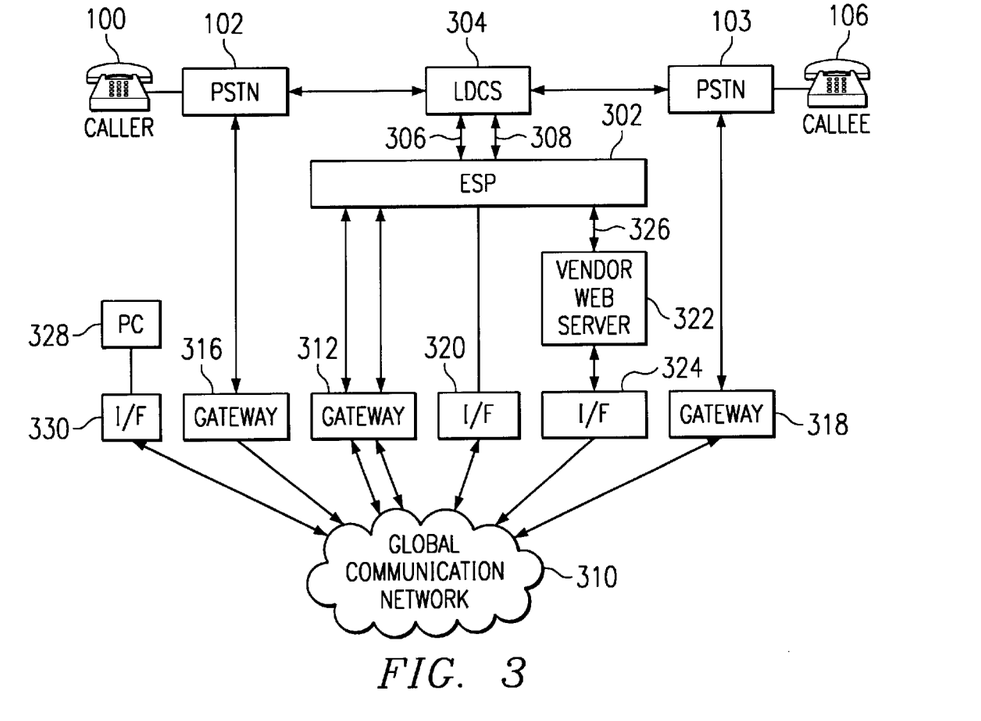
FIG. 3 illustrates an overall block diagram for the system associated with the present disclosure wherein a calling party can effect a call to a callee utilizing different features such as a pre-paid calling card, a call back feature and a call collect feature.

Referring now to FIG. 3, there is illustrated an overall block diagram for the system associated with the present disclosure wherein a calling party can effect a call to a callee utilizing different features such as a pre-paid calling card, a call-back feature and a call collect feature, all of which will be described in more detail hereinbelow. The caller at the caller location 100 is again connected to their PSTN 102. At the other end, the callee location 106 is interfaced through the associated PSTN 103. Of course, it should be understood that the PSTN 102 and the PSTN 103 could be the same PSTN as this refers to an overall network. However, the purpose for segregating this is for the purpose of discussion herein, in that there may be a different telephone that works in different countries and there may be different regions of the country associated therewith.

There is provided in the present disclosure an enhance services platform (ESP) 302, which ESP 302 provides various functions such as messaging and switching, the ESP 302 including therein a conventional cross-connect switch. The ESP 302 is operable to interface with a long distance carrier service (LDCS) 304 which LDCS 304 represents any of multiple long distance carrier providers. This could be associated with a provider of the caller 100 or the callee 106 or it could be one selected by the ESP 302. In any event, the ESP 302 is operable to provide two connections, one for the caller location 100, associated with interconnection 306 and one associated with the callee location 106, at interconnection 308. As will be described in greater detail hereinbelow, the ESP 302 is operable to interconnect with both of the locations 100 and 106 and then connect those two calls together.

The ESP 302 is also interconnected with a global communication network 310 (GCN). This is facilitated through a gateway 312, which gateway 312 provides multiple connections between the GCN 310 and the ESP 302. As will be described hereinbelow, the GCN 310 can be utilized for what is referred to as Voice-over-Internet Protocol (VoIP). This is a method wherein a voice connection can be facilitated over the GCN 310.

In order to provide for the VoIP connection, the caller location 100 has associated therewith a gateway 316 which is connected between the PSTN 102 of the caller location 100 and the GCN 310, and there is also provided a gateway 318 gateways 312, 316 and 318 comprise equipment operable for connecting between a high speed-digital access and-a digital network interface. Typically, the digital network interface will then be interfaced with the ESP 302 through a compression/decompression (CODEC) device (not shown). These gateways 312, 316 and 318 are conventional; they merely provide a way to utilize a digital network, the GCN 310, to effect a voice interface between the associated PSTNs. However, the ESP 302 has two options, the first option being use of the LDCS 304 to effect a call or the GCN 310. This will be a function of the least cost routing typically utilized by the ESP 302, this being a conventional operation.

In addition to allowing for a voice connect between two parties, the ESP 302 can also interface with the GCN 310 directly through an interface 320 which is comprised of some type of high speed modem or router, or it can be interfaced through a web server 322. The web server 322 is operable to provide various informational services to users on the network and is interfaced thereto through an interface 324. The web server 322 is interconnected through a network connection 326 to the ESP 302. In general, as will be described hereinbelow, the web server 322 will allow a user to interface with various services at the vendor's web server site 322 to provide messages and various other informational aspects.

In addition to the web server 322 providing information through the GCN 310, the caller has associated therewith a PC 328 which is interfaced to the GCN 310 through an interface 330. This can be a modem for a low speed data link, or a higher speed modem utilizing digital high speed interfaces to the GCN 310. Typically, when utilizing a high speed connection, the interface 330 will comprise a modem that interfaces through the PSTN 102 via a digital link or even an analog link to an Internet service provider (ISP) (not shown) that then provides a digital link to the GCN 310 to various conventional back bones. This, again, is conventional. It is only noted that the caller can access the vendor web server 322 through the GCN 310 and extract an interface therewith, as will be described hereinbelow.

Figure 4:
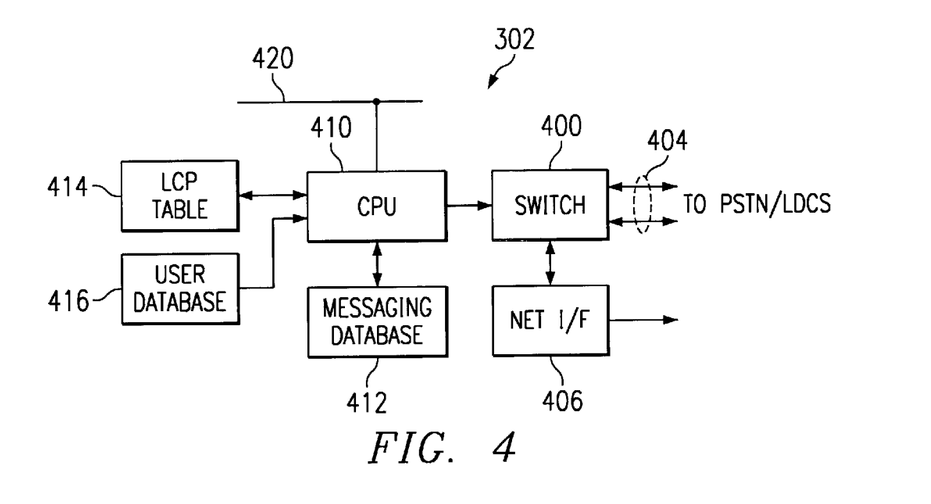
FIG. 4 illustrates a more detailed block diagram of an enhanced service platform.

Referring now to FIG. 4, there is illustrated a more detailed block diagram of the ESP 302. Generally, the ESP 302 consists primarily of a cross-connect switch 400. This cross-connect switch 400 is operable to provide call connections to the circuit-switched public telephone system through either a set of PSTN/LDCS interconnects 404 or to the packet-switched system GCN 310 through a network interface 406. This network interface 406 basically consists of the gateway 312 and interconnects thereto. This, of course, will require two connections, one for the connection to the caller location 100 and one for the connection to the callee location 106. The switch 400 is controlled by a processing unit 410 which is interfaced to various databases. There is a messaging database 412 which allows pre-defined messages to be sent to the switch 400. Additionally, there will be a least-cost routing (LCR) table database 414 which provides the various algorithms to be utilized by the CPU 410 when determining which LDCS 304 to utilize. In this mode, the switch 400 is controlled, such that a connection is made to the local PSTN and to the LDCS therethrough. This is facilitated by generating the correct calling string through one of the two interconnect ports 404.

The same situation would occur when directing the call to another party. Once the two parties are connected, this determined by the CPU 410, then the two ports can be connected together. The selection of the LDCS and the location is determined through the use of the LCR database 414 and the locations of the caller and callee. There is also provided a user database 416 to allow the CPU 410 to verify a particular user. The CPU 410 is also connected to a local network, such as an Ethernet line 420 to allow access to web server 322, this Ethernet 420 is similar to the connection 326. Therefore, there is provided a separate data path to provide the caller location 100, user ID, and callee location 106 to the CPU 410. The CPU 410 need only then control the switch 400 to connect the calls to the appropriate parties, in the matter described hereinbelow.

Figure 5:
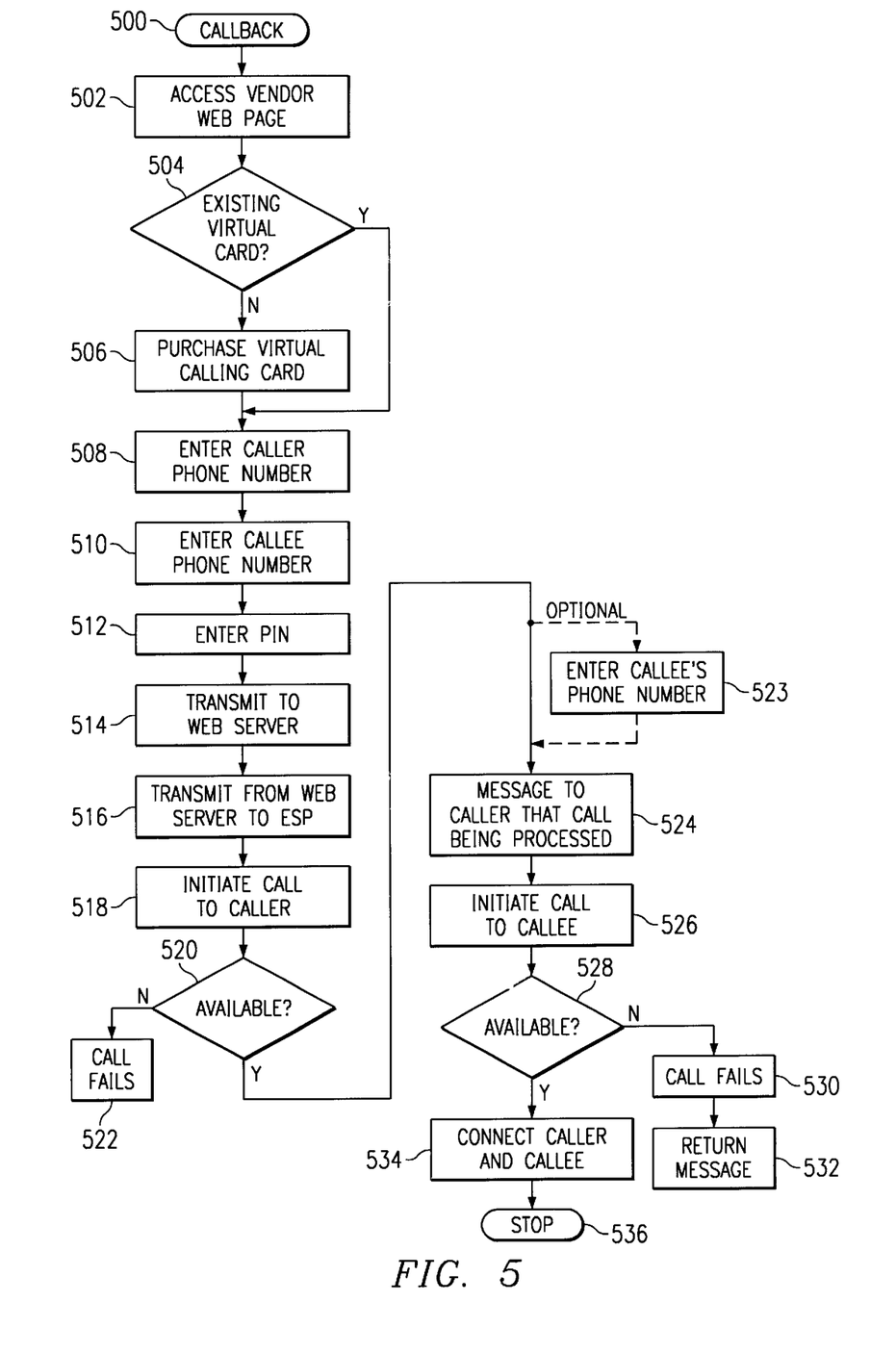
FIG. 5 illustrates a flowchart depicting the call back feature of the present disclosure.

Referring now to FIG. 5, there is illustrated a flowchart depicting the call back feature of the present disclosure. As described herein, basically, the call back feature allows a user the ability to override the costs involved with a particular local carrier. As an example, if a caller is trying to complete a call from a country such as Mexico to the US, presents systems require the caller to utilize the telephone system of Mexico to complete that call. Of course, the charges would be relatively onerous. With the system of the present disclosure, the caller is able to connect toll-free to an intermediate location, the ESP 302, to place a call request. This is facilitated through a data network. The caller will then wait by the phone, which phone number has been provided by the ESP 302, and then wait the ESP to make the various connections. The ESP 302 is located in a particular location and has access to lower cost routing systems for the phone call. Therefore, the callee can be connected to a low cost system and then the caller contacted and connected to the callee, all through lower cost systems than that available to the caller from, for example, Mexico.

Referring further to FIG. 5, the flowchart is initiated at a block 500 and then proceeds to a block 502 to access the vendor web page through the caller's PC 328. This will provide the caller with a number of options. In the call back feature, this will provide the caller with the ability to purchase a pre-paid virtual calling card. In general, a virtual calling card is nothing more than an account that resides at the vendor's site that is associated with a particular user. This account is debited for any services that are provided by the vendor. In this matter, all that is needed is some type of identification, such as a Personal Identification Number, or PIN.

The first decision the caller must make is whether there is already an existing account. This is determined at a decision block 504, wherein the users determine whether they have an existing virtual card. If not, the program will flow along the "N" path to a function block 506 wherein the user will purchase the prepaid virtual calling card. This is facilitated by the user entering credit card information, billing information phone, number, e-mail, etc. In the purchase operation illustrated in function block 506, all the information entered into the viewable screen will then be submitted to the vendor, this facilitated by selecting a location of the screen such that this information is communicated back to the vendor web server 322. This will then be processed by the vendor web server 322 and a PIN generated, a user profile generated for storage in the user database 416 and then the credit card will verified. Once the credit card is verified, the PIN is generated and the user updated into the user database 416, the PIN is returned to the screen of the caller or user.

For the situation where there is an existing virtual calling card, the program will flow along the "Y" path from decision block 504 to function block 508. In function block 508, the user is provided with a particular field within which to enter the phone number of the caller, i.e., the location that the caller will be in order to answer an incoming phone call, the call-back phone call. The program then flows to function block 510 wherein the phone number of the callee is entered. The program will then flow to function block 512 wherein the PIN of the user will be entered. Once this PIN number is entered, then this information is submitted to the web server 322, as indicated by function block 514. Once the information is transmitted to the web server 322, a confirmation is then returned including account balance and other information and also indicating that this call is being processed and that they should disconnect their modem if their modem is utilizing the same line. The user will then disconnect the data connection with the web server, although this is not necessary where the user has more than one phone line. However, typically the user has only one phone line necessitating the caller to disconnect from the web server 322 in order for the call to be returned to the caller location 100.

Once the information is sent to the web server 322, the web server 322 then transmits this information to the ESP 302, as indicated by a function block 516. The program will then flow to a function block 518, wherein the ESP 302 will initiate a call to the caller, i.e., it will call the number that the caller entered into the caller's phone number field in the web server screen. The program will then flow to a decision block 520 to determine if the caller has answered their phone. If not, the program will flow to a function block 522 wherein the call be indicated as failing. Of course, at this time, there is no connection to the caller and no identification can be provided to the caller. Although not discussed in the flowchart, it is possible that the data connection can be maintained to the caller over the PC 328 and the network interconnection therewith such that update or status information about the call can be provided to the caller. Further, the caller could be provided with a transaction number that could be checked by the caller contacting the vendor. Further, since the e-mail of the caller is known, this information could be forwarded via an e-mail to the caller. Once it is determined that the caller has answered the phone, i.e., the caller is available, the program will flow from the decision block 520 to a function block 524 wherein a message will be provided to the caller, after answering, that their call is being processed.

In an alternate embodiment of the present disclosure, the operation noted in function block 510 wherein the caller leaves the callee's phone number is replaced by an optional operation represented in a function block 523, which allows the caller to enter the callee's phone number after the call has been placed back to the caller in function block 518, once the caller has been denoted as being available, then the caller is prompted by the system to enter the callee's phone number. This is typically facilitated through the use of the keypad on the telephone. Therefore, the program will move directly out of the decision block 520 if the callee's phone number was entered in function block 510 or will flow out of the function block 523 if the optional operation noted herein is utilized. The program will then flow to a function block 526 wherein a call will be initiated to the callee. Of course, the functions in function blocks 524 and 526 are carried out in parallel. The program will then flow to a decision block 528 to determine if the callee is available, i.e., whether their phone is in an on-hook condition. If not, then the program will flow to a function block 530 indicating that the call has failed, and then return a message to the caller in a function block 532 indicating that the call has failed and the callee has not answered the phone or that the phone is busy. Both conditions could be met once the caller has answered, then the program will then flow along the "Y" path from decision block 528 to a function block 534 to then connect the caller and the callee. The program will then flow to a stop block 536.

When making a call to the callee, if the phone number of the callee is correct, the system then makes a determination as to whether it has been properly answered. This is due to the fact that there are a number of ways in which the call can be connected. The first method is merely ringing the number and doing nothing more. In this case, it is possible that the caller be connected directly to the callee's phone line such that the caller can listen to the ring, and in the event of a busy signal or disconnect prior to an off-hook condition, there will be no billing. Any number of ways could be utilized. This situation also occurs with respect to initiating the call to the caller. For example, it may be that the caller is in a hotel room. This would require the system to not only call the location number, but it would require the audible request for a room number or an individual's room. In this situation, the connection would be more complex and would require some type of processing system to process the call.

With the use of the call-back feature, it can be seen that the request was sent over a packet-switch data network such as that associated with the GCN 310 and then the ESP 302 allows the call and makes the connection utilizing a different and separate circuit-switched connection. Of course, the GCN 310 is typically a toll-free network, where as the LDCS 304 utilized by the ESP 302 would be a toll network. Alternatively, although a fee would be charged by the vendor, the ESP 302 could make the interconnection to the GCN 310 via gateway 312, gateway 316, and gateway 318 for a VoIP connection.

Figure 6:
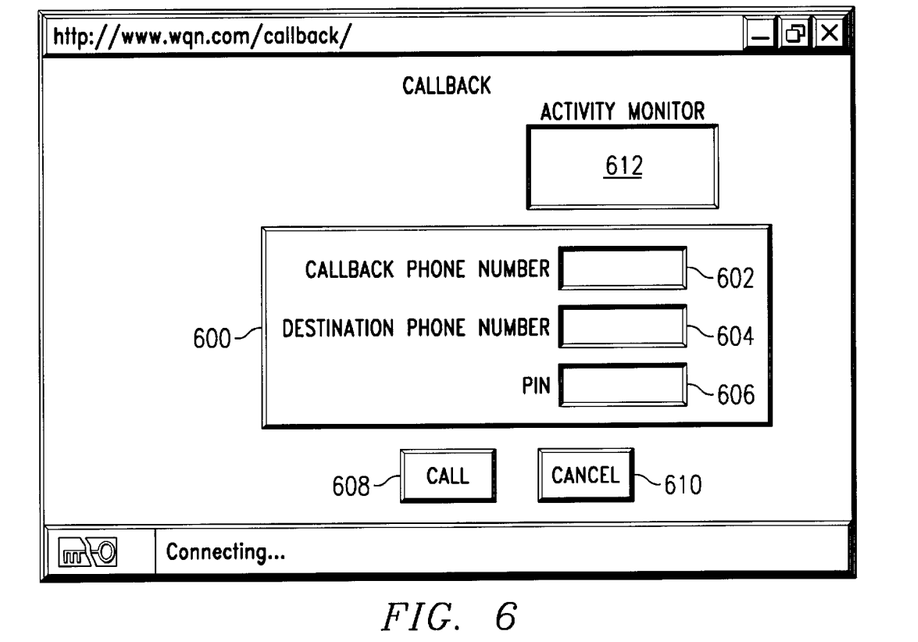
FIG. 6 illustrates a diagrammatic view of the web page presented to the caller when utilizing the call back feature.

Referring now to FIG. 6, there is illustrated a diagrammatic view of the web page presented to the caller when utilizing the call-back feature. Basically, the window illustrates a number of fields. There is provided a call back card graphic 600 comprising a field 602 for entering a call-back phone number, a field 604 for entering the destination number, and a field 606 for entering the PIN. In the event that there is no PIN, the reader can scroll down the screen (not shown) to obtain fields associated with credit card information for generating the billing information. This can then be submitted to the vendor for return of the PIN number. In the event that there is a PIN as provided by prior registration, the user will not be required to enter credit card or other personal information.

Once the information has been placed into the fields, then the user can select a location 608 associated with a call feature to submit the information to place the call. This can be canceled also with the use of a field 610 in the selection thereof. In addition, after the call has been made, there is provided an activity monitor wherein a user can be provided information as to the status of their call, this field represented by a referenced numeral 614. This is not necessarily required and it is an alternative.

Figure 7:
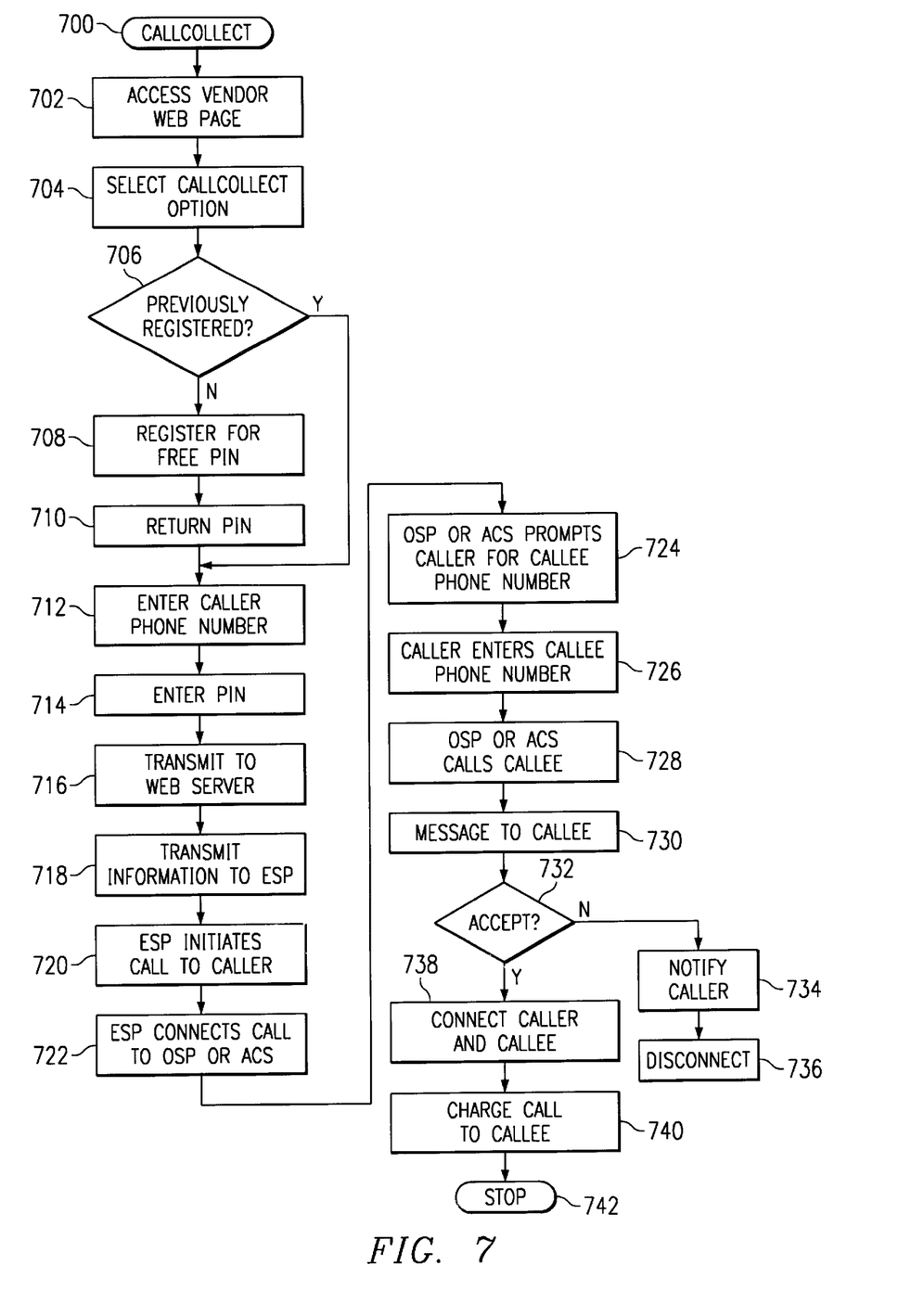
FIG. 7 illustrates a flowchart depicting a call collect feature.

Referring now to FIG. 7, there is illustrated a flowchart depicting a call collect feature. The call collect feature is that which allows a user to implement a collect call utilizing a data network for the request. In general, the request is made over the data network to the vendor server 322 by providing the caller's phone number. This system will then effect a call to the caller over the lowest cost route and then connect to the callee through an Operator Service Provider (OSP) or Automated Call Server (ACS) and inform the callee that a request for a collect call has been made from the vendor's network, and request approval. If the callee authorizes or approves the collect call, they will enter a certain sequence of digits and then the system will connect the call. The system will then bill the callee the cost of the call at a premium determined by the vendor.

Referring further to FIG. 7, the program initiated at a block 700 and then proceeds to function block 702 wherein the vendor's web page is accessed. The program then flows to a function block 704 wherein the call collect option is selected from the vendor's web page and submitted to the vendor's web server 322, this all effected over the digital link through the GCN 310. The program then flows to a decision block 706 to determined if the caller has previously registered for a PIN. If so, flow is along the "Y" path and jumps forward to a function block 712 where the caller enters the his or her phone number. On the other hand, if the caller has not previously registered for a PIN, flow is out the "N" path to a function block 708 wherein information regarding a free PIN will be entered. This information will then be transmitted to the web server 322 and the PIN returned, as indicated by the function block 710. Once the PIN is returned, the program will flow to a function block 712 wherein a screen will be presented to a caller to enter the caller's phone number, i.e., location where the caller can be reached, and then to a function block 714 wherein the PIN will be entered. The program will then flow to a function block 716 wherein this information will be transmitted to the web server 322. At this time, a screen can be returned to the caller at their PC 328 over their GCN 310 indicating that the call is being processed and that they should disconnect their modem if their modem is utilizing the same line.

Once the web server 322 has received the information, the program will flow to a function block 718 wherein this information will be transmitted to the ESP 302 from the web server 322. The ESP 302 will then initiate a call-back to the caller, as indicated by a function block 720. At this point, the ESP 302 will connect the call to an Operator Service Provider (OSP) such that a live operator is provided, or to an Automated Call Server (ACS), as indicated by function block 722. The program will then flow to a function block 724 wherein the OSP or ACS will then prompt the caller for the callee's phone number. This is utilized to effect the call to the callee. Alternatively, it is possible that the caller could input the callee's phone number and the call be automatically connected utilizing an ACS. However, with the present system, it is facilitated through the use of an OSP.

Once the caller has been connected to the OSP or ACS and has entered the callee's phone number, the program will flow to a function block 726 to receive the callee's phone number from the caller and then to a function block 728 wherein the OSP or ACS calls the callee. The OSP or ACS will then provide a message to the callee, as indicated by function block 730 that a collect call is being placed by either the particular vendor system or even provide the callee a name. The program will flow to a decision block 730 to determine if the caller has accepted. Typically, the callee will either orally indicate to the OSP that the call will not be accepted, or with use of the ACS system, depress a certain key on the handset keypad to accept or not to accept. If it is not accepted, the program will then flow along the "N" path to a function block 734 to notify the caller that it has not been accepted and then to a disconnect block 736. If accepted, the program will flow along a "Y" path from the decision block 732 to a function block 738 to connect the caller to the callee, and then to a function block 740 wherein the call will be charged to the callee. The program then flows to a stop block 742.

It can be seen that with a call collect feature, a data connection can be utilized through a first network to provide information to a switching node of a request to place a collect call. Thereafter, the caller will be called at the noted location received over the data network, a connection implemented therewith and then a collect call processed to the callee's phone number. This allows the use of a data network to bypass any local call or even alleviate the need to utilize some type of toll-free number to initiate the call. Through the use of a data network, this always circumvents the problem of calling through a phone system that has onerous charges for even a standard toll-free phone call. For example, if one were calling from Mexico, it would be necessary to go through the Mexican telephone system in order to get to the U.S. telephone system to place a toll-free call.

Figure 8:
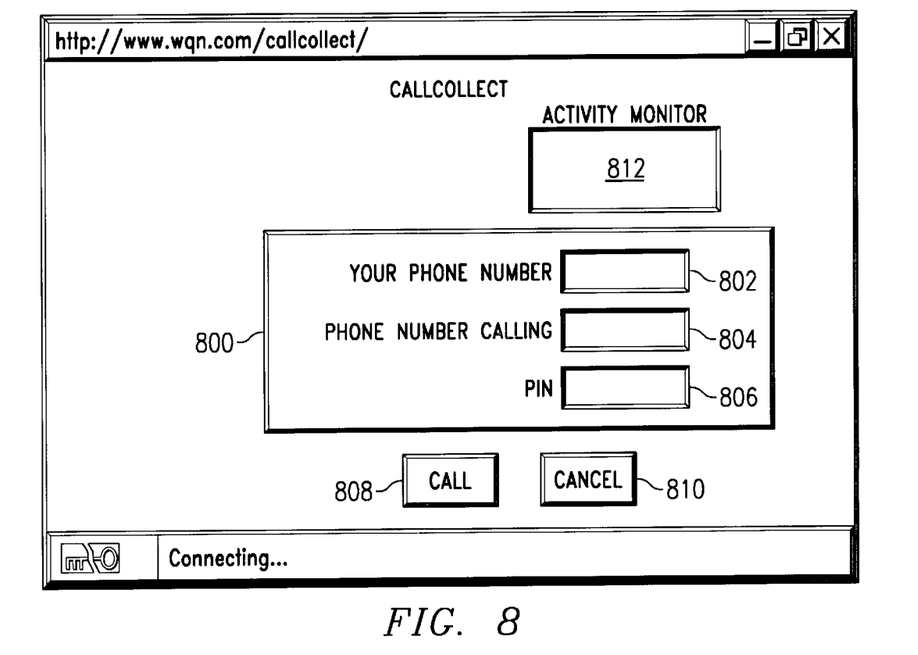
FIG. 8 illustrates a diagrammatic view of the screen for the call collect feature returned by the web server to the caller PC.

Referring now to FIG. 8, there is illustrated a diagrammatic view of the screen for the call collect feature returned by the web server 322. There are provided a number of fields for use by the caller. There is provided a call collect card graphic 800 having a field 802 for receiving the phone number of the calling party, a field 804 for the called party, i.e., phone number of the callee, and a field 806 for the PIN. This is all contained within graphic 800. Of course, if the OSP is utilized, the calling party's number need not be entered. Once all this information is entered, a field 808 allows the caller to transmit the information to the web server 322, or alternatively, a field 810 allows the caller to terminate the call request. In addition, after the call has been made, there is provided an activity monitor wherein a user can be provided information as to the status of their call, this field represented by a referenced numeral 614. This is not necessarily required and it is an alternative. In addition, after the call has been made, there is provided an activity monitor wherein the caller can be provided information as to the status of their call, this field represented by a referenced numeral 812. This is not necessarily required and it is an alternative.

It can be appreciated that a user may also purchase a virtual pre-paid calling card for use other than call back or call collect. Purchase of the virtual pre-paid calling card may be accomplished by methods similar to the purchase of a call back or call collect card where credit information is entered in order to obtain a card having a fixed value. When the value of the card is expended, the user may simply recharge the card, or purchase a new one. However, the web server 322, instead of sending information to the ESP 302 for call initiation, returns a toll-free access phone number and a PIN to the web page displayed on the PC 328 user. The user may then print the web page and retain the information for future use. The caller uses the virtual pre-paid card information in the conventional sense by calling the ESP 302 and entering the PIN and the phone number of the callee. The ESP then verifies the PIN according to the user database 416, provides messaging to the caller as to how much time remains on the calling card, and places the call.

Although the preferred embodiment has been described in detail, it should be understood that various changes, substitutions and alterations can be made therein without departing from the spirit and scope of the invention as defined by the appended claims.

What is claimed is:

1. A method of establishing a call between two parties, comprising the steps of:

initiating a call request of a caller at a caller location over a first communication network to an intermediate location, the call request seeking to cause that a call be connected to a callee at a callee location over a second communication network;

connecting to the caller location over the second communication network; and in response to connecting to the caller location, connecting the callee location and the caller location over the second communication network.

2. The method of claim 1, wherein the first communication network is a packet-switched global communication data network and the second communication network is a circuit-switched public telephone network.

3. The method of claim 1, wherein the step of initiating is performed through a computer of the caller, the computer operable to connect to a vendor web server on the first communication network, the vendor web server interfacing to the intermediate location to cause a connection of the caller location and callee location over the second communication network.

4. The method of claim 3, wherein the intermediate location is an enhanced services platform operable to make the connection between the caller location and the callee location over either the first communication network or the second communication network according to least cost routing.

5. The method of claim 1, wherein the step of initiating further comprises the step of disconnecting a computer of the caller from the first communication network prior to the step of connecting the caller location over the second communication network.

6. The method of claim 1, wherein the intermediate location is an enhanced services platform which connects to an operator services provider or an automated call service to provide messaging to the caller and the callee.

7. A method for establishing a call between two parties, comprising the steps of:

initiating a call request of a caller at a caller location over a first communication network to an intermediate location, the call request seeking to cause that a call be connected to a callee at a callee location over a second communication network;

connecting to the caller location over the second communication network;

requesting a confirmation from the callee location that a connection between the caller location and the callee location is authorized; and in response to receiving the confirmation from the callee location, connecting the callee location and the caller location over the second communication network.

8. The method of claim 7, wherein the first communication network is a packet-switched global communication data network and the second communication network is a circuit-switched public telephone network.

9. The method of claim 7, wherein the step of initiating is performed through a computer of the caller, the computer operable to connect to a vendor web server disposed on the first communication network, the vendor web server interfacing to the intermediate location to cause a connection of the caller location and callee location over the second communication network.

10. The method of claim 7, wherein the intermediate location is an enhanced services platform operable to make the connection between the caller location and the callee location over either the first communication network or the second communication network according to least cost routing.

11. The method of claim 7, wherein the step of initiating further comprises the step of disconnecting a computer of the caller from the first communication network prior to the step of connecting the caller location over the second communication network.

12. The method of claim 7, wherein the intermediate location is an enhanced services platform which connects to an operator services provider or an automated call service to provide messaging to the caller and the callee.

13. A method of making a telephone call, comprising the steps:
   accessing, by a caller, a telecommunications switch disposed on a packet-switched network;
   transmitting a call request of the caller to the telecommunications switch to cause a call connection to be made to a callee; and
   establishing the call connection between the caller and the callee over a circuit-switched network in response to the telecommunications switch processing the call request.

14. The method of claim 13, wherein the packet-switched network is a global communication network and the circuit-switched network is a public switched telephone network.

15. The method of claim 13, wherein the step of accessing is performed by the caller first accessing a vendor web server disposed on the packet-switched network, the caller sending call information to the vendor web server which in turn causes the telecommunication switch to connect the caller and the callee.

16. The method of claim 13, wherein the step of accessing further comprises the step of purchasing a virtual prepaid calling card from a vendor by accessing, through a personal computer of the caller, the vendor web server disposed on the packet-switched network, the virtual prepaid calling card used for calling the callee, and having a personal identification number associated therewith.

17. The method of claim 13, further comprising the step inputting which includes inputting a phone number of the caller, a phone number of the callee, and a personal identification number into a web page presented by a vendor web server to a computer of the caller for transmission to the telecommunications switch.

18. The method of claim 13, further comprising the step generating automated messaging in response to the step of inputting call information to the telecommunications switch.

19. The method of claim 13, wherein the step of establishing is performed only in response to the callee accepting the call request.

20. The method of claim 13, wherein the telecommunication switch is operable to cause the call to be made over either the packet-switched network or the circuit-switched network according to least cost routing.

21. The method of claim 13, wherein the step of accessing further comprises the step of accessing via a personal computer of the caller, a vendor web server disposed on the packet-switched network, to initiate a callback call.

22. A system for establishing a call between two parties, comprising:
   a call request initiated by a caller at a caller location over a first communication network to an intermediate location, said call request seeking to cause that a call be connected to a callee at a callee location over a second communication network;
   wherein said caller location is connected to said second communication network, in response to which said callee location and said caller location are connected over said second communication network.

23. The system of claim 22, wherein said first communication network is a packet-switched global communication network and said second communication network is a circuit-switched public telephone network.

24. The system of claim 22, wherein said caller connects to said first communication network via a computer, said computer operable to connect to a vendor web server disposed on said first communication network, said vendor web server interfacing to said intermediate location to cause a connection of said caller location and said callee location over said second communication network.

25. The system of claim 22, wherein said intermediate location is an enhanced services platform operable to make the connection between said caller location and said callee location over either said first communication network or said second communication network according to least cost routing.

26. The system of claim 22, wherein a computer of the caller is disconnected from said first communication network prior to said intermediate location connecting said caller location over said second communication network.

27. The system of claim 22, wherein said intermediate location is an enhanced services platform which connects to an operator services provider or an automated call service to provide messaging to said caller and said callee.

28. A system for establishing a call between two parties, comprising:
   a call request initiated by a caller at a caller location over a first communication network to an intermediate location, said call request seeking to cause that the call be connected to a callee at a callee location over a second communication network;
   wherein said caller location is connected to said second communication network;
   wherein said intermediate location requests a confirmation from said callee location that a connection between said caller location and said callee location is authorized;
   wherein the call is established between said callee location and said caller location in response to receiving said confirmation from said callee.

29. The system of claim 28, wherein said first communication network is a packet-switched global communication network and said second communication network is a circuit-switched public telephone network.

30. The system of claim 28, wherein said caller connects to said first communication network via a computer, said computer operable to connect to a vendor web server disposed on said first communication network, said vendor web server interfacing to said intermediate location to cause a connection of said caller location and said callee location over said second communication network.

31. The system of claim 28, wherein said intermediate location is an enhanced services platform operable to make the connection between said caller location and said callee location over either said first communication network or said second communication network according to least cost routing.

32. The system of claim 28, wherein a computer of the caller is disconnected from said first communication network prior to said intermediate location connecting said caller location over said second communication network.

33. The system of claim 28, wherein said intermediate location is an enhanced services platform which connects to an operator services provider or an automated call service to provide messaging to said caller and said callee.

34. A system for making a telephone call, comprising:
   a packet-switched network for the transmission of data and having a telecommunications switch disposed thereon;
   a circuit-switched network for the transmission of voice information thereon;
   wherein a caller at caller location accesses said telecommunications switch to input a call request, said telecommunications switch establishing a call connection between said caller and a callee at a callee location over said circuit-switched network in response to said call request being processed by said telecommunication switch.

35. The system of claim 34, wherein said packet-switched network is a global communication network and said circuit-switched network is a public switched telephone network.

36. The system of claim 34, wherein said caller uses a computer to access a vendor web server disposed on said packet-switched network, said caller sending said call request to said vendor web server which in turn causes said telecommunication switch to connect said caller location and said callee location.

37. The system of claim 34, wherein the caller purchases a virtual prepaid calling card from a vendor by accessing, through a computer of said caller, a vendor web server disposed on said packet-switched network, said virtual prepaid calling card used for calling said callee and having a personal identification number associated therewith.

38. The system of claim 34, said caller accesses a vendor web server and inputs into a web page presented by a vendor web server to a computer of the caller, a phone number of said caller, a phone number of said callee, and a personal identification number for transmission to said telecommunications switch.

39. The system of claim 34, wherein said telecommunications switch causes messaging to be generated to said caller and said callee in response to inputting said call request to said telecommunications switch.

40. The system of claim 34, wherein the call is established between said caller location and said callee location only in response to authorization by said callee.

41. The system of claim 34, wherein said telecommunication switch is operable to cause the call to be made over either said packet-switched network or said circuit-switched network according to least cost routing.

* * * * *